United States Patent [19]
Fujii et al.
[11] Patent Number: 4,913,964
[45] Date of Patent: Apr. 3, 1990

[54] COVERING MATERIAL FOR ELECTRIC TRANSMISSION LINES, AND ELECTRIC TRANSMISSION LINE

[75] Inventors: Fusayoshi Fujii, Machida; Kenji Hijikata, Mishima; Makoto Iiyama; Toshio Nakane, both of Fuji; Yukihiko Kageyama, Fujinomiya, all of Japan

[73] Assignee: Polyplastics Co., Ltd., Osaka, Japan

[21] Appl. No.: 159,121

[22] Filed: Feb. 23, 1988

[30] Foreign Application Priority Data

Feb. 23, 1987 [JP] Japan ........ 62-39613

[51] Int. Cl.$^4$ ........ B32B 15/00; H01B 7/00

[52] U.S. Cl. ........ 428/379; 174/110 PM; 428/372; 428/375; 428/389

[58] Field of Search ........ 428/375, 379, 372, 389; 174/110 PM; 528/299, 308

[56] References Cited

U.S. PATENT DOCUMENTS

| | | | |
|---|---|---|---|
| 3,037,964 | 6/1962 | Bruson et al. | 528/299 |
| 3,338,743 | 8/1967 | Laganis | 528/299 X |
| 3,356,631 | 12/1967 | Jackson et al. | 528/299 X |
| 3,697,625 | 10/1972 | Smith et al. | 528/299 X |
| 4,278,785 | 7/1981 | Rosenfeld | 528/308 X |
| 4,283,523 | 8/1981 | Salee et al. | 528/299 X |

FOREIGN PATENT DOCUMENTS

| | | |
|---|---|---|
| 0248208 | 12/1987 | European Pat. Off. . |

*Primary Examiner*—Lorraine T. Kendell

[57] ABSTRACT

An electric transmission line comprises an electrically conductive line and a covering layer on the line being composed of a halogen-containing, flame-retarding, aromatic polyester of (A) an aromatic dicarboxylic acid or an ester-forming derivative thereof, (B) an aliphatic glycol or an ester-forming derivative thereof and (C) an ester-forming compound containing a halogen atom.

14 Claims, No Drawings

COVERING MATERIAL FOR ELECTRIC TRANSMISSION LINES, AND ELECTRIC TRANSMISSION LINE

The present invention relates to a covering material for electric transmission lines, comprising a halogen-containing flame retardant aromatic polyester copolymer which has thin coating capabilities, and more particularly, to a covering material for insulated electric transmission lines which is contributive toward space saving through line thickness reduction, and which has excellent heat resistance, flame retardancy, and mechanical properties (flex resistance in particular), and to an electric transmission line (electric wire) covered with such covering material.

Prior Art its Problem

Electric transmission lines have two types of roles, namely, energy transmission and information transmission. They are required to involve less energy loss in the process of transmission and also to exhibit reliable performance through accurate response to information signals.

Recently, along with the trend for high integration of information, the importance placed on the reliability of information transmission is becoming increasingly great, and on the other hand, such high integration trend adds to the severeness of the circumstances for use of transmission lines. That is, such high integration results in high jamming of information transmission lines and decreased free volume. In the areas of space rockets, aircrafts, automobiles, electrical equipment, and information-related products, in all of which space volume is limited, this tendency is particularly remarkable. Similarly, information integration is progressing in areas adjacent heat and vibration sources for the purpose of close control of energy and power sources. Thus, opportunities for transmission lines being exposed to high-heat, combustion, and vibration atmospheres are on the increase. As a result of such changes in the environmental conditions for use of transmission lines, much higher performance requirements are now imposed on transmission lines. That is, in order to realize space saving, transmission lines are required to meet these conditions: that the lines should be as thin as possible in order to realize space saving; that they should have flex properties enough to cope with odd-shaped space and foldability at sharp angles; that they should have high heat resistance and high flame retardancy; and that they should have good resistance to contact wear due to vibration in order to prevent short circuiting due to covering-material wear. In addition, they are required to have good electrical properties.

Hitherto, in the area of electric transmission lines, strands have been used as conductors, while natural rubber, synthetic rubber, polyvinyl chloride, polyethylene, polypropylene, nylon, and the like have been used for covering materials. For the purpose of covering materials in particular, polyvinyl chloride has been largely used from the standpoints of flame retardancy and mechanical strength.

However, with changes in the environments for use it has now become difficult for polyvinyl chloride to meet the changing requirements. In order to meet the requirements for wire thickness reduction, conductors have limitations in themselves. Much depends on thickness reduction of covering materials. However, thickness reduction of a covering material naturally results in degradation in its protective characteristics, heat resistance, and wear resistance. In order to overcome such difficulty, an attempt has been made to increase the heat resistance of polyvinyl chloride or polyethylene by crosslinking, but this involves the process of crosslinking in connection with the step of coating with the covering material. Therefore, from the standpoint of manufacturing, thin coating with a covering material is extremely difficult and not realistic. Furthermore, it naturally involves degradation in tensile extensibility, that is, sacrificing of flex property, due to crosslinking.

Nylon and the like, in which the resin itself has heat resistance, has excellent mechanical properties, but it lacks moisture resistance; as such, these resins are liable to considerable deterioration in their physical properties and are not reliable when they are applied for thin coating. Other engineering plastics, such as polyphenylene sulfide and polyether imide, can satisfy the heat resistance requirements, but they have some deficiency with respect to flexibility. As such, these plastics involve considerable difficulty in property balancing and further they are economically disadvantageous.

In the area of resin compositions for electric wire covering, crystalline polyesters, such as polyethylene terephthalate and polybutylene terephthalate, have hitherto been used because of their favorable properties including mechanical strength, heat resistance, and electrical characteristics. In order to improve their flex resistance and impact resistance, it has been proposed to use a composition comprising a blend of polyethylene terephthalate or polybutylene terephthalate with polyolefin, or to blend a special grafted polyolefin resin with polyethylene terephthalate.

However, these polyester resin compositions proposed for electric wire covering have also been found unsatisfactory with respect to property balancing of flame retardancy and coat thickness reduction relative to protective characteristics and wear resistance.

In the matter of coat thickness reduction, it is known to provide a 5–100 micron thick coat using polyethylene terephthalate, but this is simply directed to coat thickness reduction with respect to motor windings; it cannot be used in any such application as low-voltage transmission lines to which this invention is directed, wherein importance is placed on flame retardancy and protective performance characteristics, such as wear resistance.

It is extremely difficult to meet the requirements for coat thickness reduction to the order of less than 0.4 mm, for example, concurrently with those for flame retardancy, protective properties, and other characteristics, by using known materials. There has been no case of such a practical application.

SUMMARY OF THE INVENTION

In view of the foregoing problem, the present inventors made extensive studies into the possibility of obtaining an electric transmission line having a reduced thickness sufficient to permit space saving and having high heat resistance, good flame retardancy, and excellent mechanical characteristics (flex properties in particular). As a result, they found that a certain polyester copolymer could serve as a thin coat covering material with well-balanced performance characteristics including heat resistance, flame retardancy, mechanical properties, and processability.

Thus, the present invention provides a covering material for electric transmission lines, comprising a halogen-containing flame retardant aromatic polyester copolymer produced by condensation polymerization reaction of (A) principally an aromatic decarboxylic acid or its ester-forming derivative,
(B) principally an aliphatic glycol or its ester-forming derivative, and
(C) an ester-forming compound containing a halogen, and an electric transmission line covered with such covering material.

The electric transmission line (electric wire) used in the invention is not particularly limited, but from the standpoints of flexibility and reliability, strands are used. A preferred type of strand is such that it has been passed through a compression stage in the process of manufacture so that its conductor surface is smoothed so as to facilitate thin coating and such that gaps between strands are narrowed for space saving. That is, compressed strands are preferred. More particularly, circular compressed strands are preferred for the convenience of precise controlling of thin coating a the stage of wire covering.

The material of the conductor may be aluminum, copper, tin-plated copper, aluminum alloy, or the like. These materials may be selectively used according to the purpose for which the conductor is used.

For example, the thickness of a covering insulator for the conductor of an automotive transmission line is subject to limitations by the processability and covering characteristics of the covering material used, but it is desirable that the covering insulator be as thin as practicable. Conventionally, the thickness of a covering material could not be reduced beyond the limit of 0.9 mm–0.6 mm from the view points of both electrical and mechanical characteristics and, more particularly, from the view point of wear resistance of a thin coat. According to the invention, however, it is possible to provide a coat thickness of 0.4 mm, or even less than 0.3 mm.

A covering insulator for an automotive transmission line, for example should desirably have the following properties: (a) flame retardancy such that flame will die out within 30 seconds, preferably within 15 seconds, after ignition; (b) ease of bending and good flexibility, that is, high extensibility of the order of more than 100%, preferably 125%, at ordinary temperatures, and (c) high wear resistance such that the minimum wear resistance is of the order of more than 305 mm according to JIS C 3406, in view of the fact that where the transmission line is used at a location adjacent a source of vibration, it is necessary to prevent short circuiting due to friction between covering materials, as well as their friction with adjacent components.

The present inventors made a series of studies into the possibility of obtaining a covering material having such performance characteristics, and as a result they found it possible to realize the aforesaid thin coating and obtain a covering material having the aforesaid good balance of properties by using an aromatic polyester copolymer in which a certain halogen-containing flame retardant compound is copolymerized.

Some of such aromatic polyester copolymers have been known for use in the manufacture of flame resistant polyester filaments for woven and knitted fabrics, but the use of such copolymer as a covering material useful for the purpose of manufacturing thin-coated low-voltage electric transmission lines as in the present invention has not been known.

Unlike the case with above said filaments, it is extremely difficult to provide a covering material with such properties as heat resistance, flame retardancy, and wear resistance, concurrently with flexibility. In order to achieve this task, conflicting series of properties must be had in good balance. Usually, improvements in some properties will result in degradation in other properties.

According to the present invention a flame retardant substance is incorporated as a copolymer into polymer molecules, whereby a much better property balancing is effected as compared with the case of compound conjugation. The incorporation of a halogen compound as a copolymer eliminates the possibility of flame retarder leaching, and as its secondary effect, wire-to-wire blocking can be effectively avoided in the process of manufacture which will be hereinafter described.

The polyester copolymer used in the present invention will now be described in detail.

Referring to the constituents of the aromatic polyester copolymer as coating material of the invention, constituent (A) consists principally of an aromatic dicarboxylic acid or its ester-forming derivative. A typical example of such substance is terephthalic acid or its derivative. In addition, as supplementary ingredients, the following may be mentioned: dicarboxylic acids, such as isophthalic acid, naphthalene carboxylic acid, and naphthalene dicarboxylic acid, or their derivatives; aliphatic acids, such as adipic acid, sebacic acid, trimellitic acid, and succinic acid, or their ester-forming derivatives; and aromatic hydroxycarboxylic acids, such as hydroxybenzoic acid and hydroxynaphthoic acid, or their ester forming derivatives.

Constituent B of the polyester copolymer of the invention consists principally of an aliphatic diol or its ester forming derivative. A typical example of such substance is low molecular weight glycols of $C_2$–$C_8$. For example, ethylene glycol, 1,4-butylene glycol, 1,3-propane diol, 1,4-butene diol, 1,6-hexane diol, and 1,8-octane diol are mentioned as such. In addition to these low molecular weight glycols, a high molecular weight glycol, such as polyalkylene oxide glycol, may also be used. For example, polyethylene oxide glycol, polybutylene oxide glycol, or the like may be used as such. The use of such high molecular weight glycol in combination with aforesaid low molecular weight glycol is very helpful in improving the extensibility of the aromatic polyester as covering material for electric wires of the invention, in order to provide good flex properties. As a supplementary part of the constituent (B), it is possible to use aromatic alcohols, such as bisphenol A and 4,4′-hydroxybiphenyl, alkylene oxide adduct alcohols, such as an ethylene oxide 2 mol adduct of bisphenol A, and a propylene oxide 2 mol adduct of bisphenol A, and polyhydroxy compounds, such as glycerine and pentaerythritol, or their ester-forming derivatives.

The polyester copolymer as a covering material for electric wires of the invention is an aromatic polyester copolymer in which an ester-forming compound containing a hologen is used as constituent (C) in the form of a monomer, whereby the hologen is combined into the molecular structure of the copolymer. Examples of halogen-containing compounds useful for this purpose are illustrated below. For the halogen, bromine is particularly preferred.

(1)

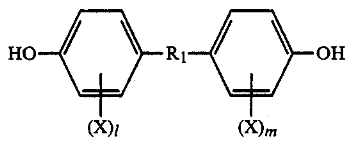

(2)

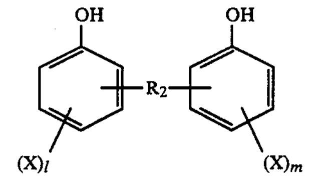

(3)

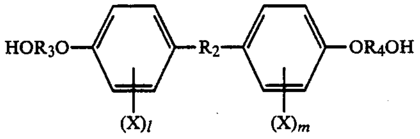

(4)

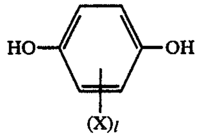

(5)

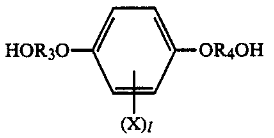

(6)

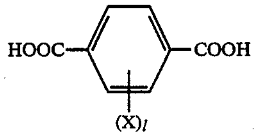

(7)

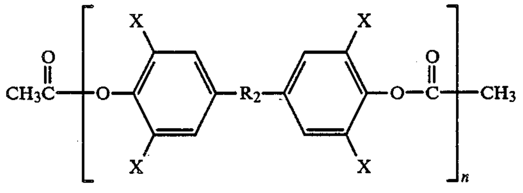

(8)

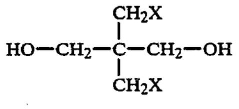

where,

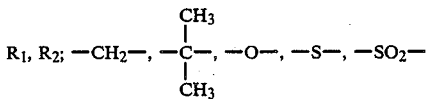

$R_3$, $R_4$; $-C_2H_4-$, $-C_3H_6-$, $-(C_2H_4O)_n-$, $-(C_3H_6O)_n-$

X: hologen
l, m: 1–4
n: an integer of 1 or above.

Halogen compounds preferred for incorporation as a copolymer compound are those expressed by general formulas (1)–(7). Where the halogen is bromine, examples of compounds coming under general formula (1) are tetrabromo bisphenol A and tetrabromo bisphenol sulfone; an example of compounds under general formula (2) is tetrabromo bisphenol F; examples of those under general formula (3) are an ethylene oxide 2 mol adduct of tetrabromo bisphenol A, a propylene oxide 2 mol adduct of tetrabromo bisphenol A, an ethylene oxide 2 mol adduct of tetrabromo bisphenol sulfone, and a propylene oxide 2 mol adduct of tetrabromo bisphenol sulfone; an example under general formula (4) is tetrabromo hydroquinone; an example under general formula (5) is an ethylene oxide 2 mol adduct of tetrabromo hydroquinone; an example under general formula (6) is tetrabromo terephthalic acid; and an example of general formula (7) is a polycarbonate of tetrabromo bisphenol A.

The molecular weight of a halogen compound for incorporation as a copolymer composition is preferably more than 390. If the molecular weight is smaller, the compound will not contribute toward improvement in the oxygen index. Preferably, the compound should have at least one or more aromatic ring in its molecule.

Such a halogen compound is added so that the proportion of the halogen compound in the copolyester produced is 0.5–20 mol % preferably 1–15 mol %, relative to the entire monomer units (A+B+C) which constitute the copolyester. This corresponds to a halogen content of 1–30 wt %, preferably 2–25%, in the copolyester. If the proportion is less than 0.5 mol %, no satisfactory flame retardancy can be obtained. If it is more than 20 mol %, some degradation in mechanical properties will result.

Proportions of monomers for preparation of the polyester copolymer in the present invention should be such that where the ester-forming functional group of the halogen compound as constituent (C) is alcoholic, the proportion of constituents (B)+(C) is 90–200 mol, preferably 95–100 mol, relative to 100 mol of constituent (A). If the ester-forming functional group of the halogen compound as constituent (C) is of the carboxylic acid system, the proportion of constituent (B) should be 90–200 mol, preferably 95–150 mol, relative to 100 mol of constituents (A)+(C).

If a covering material having a higher oxygen index is required depending upon the conditions of service, the requirement can be met by suitably adjusting the proportion of constituent (C).

The copolymer to be used in the invention may be prepared by known condensation-polymerization techniques, such as interfacial polycondensation and melt bulk polymerization. Any such copolymer having an inherent viscosity of 0.5–3.0 is useful for the purpose of the invention.

In order to obtain a highly polymerized copolymer, it is possible and even preferable to employ the technique of solid-state polymerization including heat treatment and otherwise under reduced pressure or in the presence of inert gases.

It is preferable that the resin composition used as the covering material has a relatively high viscosity when it is a melt, from the viewpoint of the ease of thin coating. However, excessively high viscosity is detrimental to the mechanical properties of the material.

The covering material of the invention exhibits excellent performance characteristics without the presence of any particular additive therein. In order to further improve its performance characteristics, however, it is possible to use, as required, such stabilizers as antioxidant and ultraviolet light absorber, antistatic agents, flame retardants, flame retarding assistants, such colorants as dyes and pigments, and other substances for fluidity and releasability improvement, such as lubricants, lubricating agents, crystallization accelerators (nucleating agents) and inorganic materials. Referring to flame retarding agents in particular, antimony compounds, such as antimony trioxide and antimony halide, and also metallic compounds, such as zinc and bismuth, and clay-type silicates, such as magnesium hydroxide and asbestos, are useful as such.

Among the useful inorganic materials are various inorganic fibers, such as glass fiber, ceramic fiber, boron fiber, potassium titanate fiber, and asbestos; powder and granular materials, such as calcium carbonate, highly dispersible silicate, alumina, aluminum hydroxide, talc, clay, mica, glass flakes, glass powder, glass beads, quartz powder, silica sand, wollastonite, carbon black, barium sulfate, plaster of paris, silicon carbide, alumina, boron nitride, and silicon nitride; and lamellar inorganic compounds, whiskers, and the like.

Such inorganic fillers may be used for admixture in one kind or in a combination of two or more kinds.

Further, in order to improve the met-extrusion coating performance, lubricating property, flexibility, and the like characteristics of the covering material, it is possible to admix, by way of supplement, one or more kinds of organic polymeric materials. Examples of such polymeric materials are other kinds of polyesters, polyamides, polyolefins, and their copolymers, low molecular-weight polyethylenes, polycarbonates, polyurethanes, rubber-like polymeric materials, such as butyl rubber are ABS, multi-phase copolymers composed of polyacrylates, thermoplastic segment-type copolyesters (including graft copolymers), and phosphoric compounds.

The electric transmission line of the invention is manufactured by known techniques. Usually, the covering material is coated on a running line of conductor as it is melt extruded. There are two ways of manufacturing, one in which the direction of conductor run and the direction of extrusion of the covering material are collinear, and the other in which a cross head having a certain angular position is employed. The transmission line of the invention can be manufactured in either way.

For extrusion operation, it is possible to employ a screw-type extruder with which it is easy to control the flow rate of the covering material.

Detection of thickness irregularities of the covering material is carried out by employing known techniques, such as X-ray and ultrasonic methods.

Any eccentricity of the covering material due to its thickness irregularity is expressed in terms of concentricity $e_c$. The greater the concentricity value $e_c$, the better. It is preferably more than 65%, more preferably more than 70%.

$$e_c = \frac{e_{min}}{e_{max}} \times 100$$

$e_{min}$: minimum thickness of coat section
$e_{max}$: maximum thickness of coat section Thickness irregularity control is performed by detecting such an irregularity by means of a eccentricity detector, then adjusting the clearance between the die and the conductor at the die center of the screw-type extruder either automatically or manually, or by controlling the flow rate of the covering material in conjunction with pressure and temperature control.

Use of a non-eccentric head is helpful in minimizing thickness irregularities.

In the process of manufacture, if so required, it is possible to pass the wire through a heating zone after the covering material is coated thereon and shaped, in order to further improve the mechanical strength of the covering material. The temperature of the heating zone should be lower than the melting point of the covering material and higher than the glass transition point thereof.

The covering material used in the invention has a flame retarding compound incorporated as a copolymer therein, and therefore, it is free from he possibility of such flame retarder or plasticizer leaching at high temperatures as is often seen with polyvinyl chloride compositions; therefore no wire-to-wire blocking is likely to occur in the process of manufacture. This permits higher speed wire coating and contributes toward production cost saving.

Advantages of the Invention

The wire covering material of the invention provides the following advantages:

(1) The covering material is highly heat resistant and flame retardant. Therefore, it is effective for use in locations adjacent heat sources, transport equipment engines, or heat generating components of electric appliances. It is also good for use as a plenum cable for fire protection purposes in buildings.

(2) Wire thickness reduction is realized without detriment to electrical properties. Further, the covering material has good flex properties. Therefore, the possibility of effective utilization of limited space is strikingly enhanced. More particularly, the transmission line according to the invention can be advantageously employed for wiring in various types of transport equipment, such as space rockets, aircrafts, and automobiles, electric appliances, computers, and information related equipment, all of which are highly information-integrated and are limited in space volume. Space saving can be furthered not only in single-strand applications, but also in wire harness applications wherein a plurality of wires are collectively assembled. Wire-to wire frictional wear can be minimized.

(3) Since the covering material has good flex property and extensibility, and also high wear resistance, it greatly contributes toward prevention of short circuiting due to wire-to-wire contact or contact between wire and other components which might result from engine vibration or otherwise.

(4) There is little possibility of wire-to-wire blocking in the process of manufacture. This permits faster covering operation and production cost reduction.

Because of these outstanding characteristics, the electric transmission line according to the invention can be advantageously employed particularly as a low-voltage transmission line, and is applicable in various other ways in such areas as transport equipment, electric and electronic appliances, information equipment, and various machines.

EXAMPLE

The invention will be explained further with reference to the following examples. Copolymers P, Q, and R were prepared in the following ways, respectively.

PREPARATION EXAMPLE 1

(Preparation of Copolymer P)

Into a reactor having an agitator, a nitrogen introduction pipe, and a distillation pipe were charged 970 parts by weight of dimethyl terephthalate, 513 parts by weight of butane diol, and 158 parts by weight of an ethylene oxide 2 mol adduct of tetrabromo bisphenol A, together with a small amount of a catalyst (0.7 part by weight of tetrabutoxy titanium), and the mixture was stirred under a stream of nitrogen gas at 170° C. for 30 minutes. The temperature was gradually raised and the mixture was heated at temperatures of 200° C. to 270° C. under stirring for 3 hours. Then, after nitrogen introduction was discontinued, the reactor was gradually subjected to pressure reduction so that the pressure in the reactor was reduced to 0.5 mmHg in 15 minutes. Agitation was carried out under this pressure at 270° C. for 4 hours. The polymer thus obtained had an inherent viscosity of 1.1 and a Br content of 6.5 wt %.

PREPARATION EXAMPLE 2

(Preparation of Copolymer Q)

Into a reactor having an agitator, a nitrogen introduction pipe, and a distillation pipe were charged 931 parts of dimethyl terephthalate, 39 parts by weight of dimethylene isophthalate, 513 parts by weight of 1,4-butane diol, and 171 parts by weight of a propylene oxide 2 mol adduct of tetrabromo bisphenol sulfone, together with a small amount of a catalyst (0.7 part by weight of tetrabutoxy titanium), and the mixture was stirred under a stream of nitrogen gas at 170° C. for 30 minutes. The temperature was gradually raised and the mixture was heated at temperatures of 200° C. to 270° C. under stirring for 3 hours. Then, after nitrogen introduction was discontinued, the reactor was gradually subjected to pressure reduction so that the pressure in the reactor was reduced to 0.5 mmHg in 15 minutes. Agitation was carried out under this pressure at 270° C. for 3.5 hours. The polymer thus obtained had an inherent viscosity of 1.0 and a Br content of 6.3 wt %.

PREPARATION EXAMPLE 3

(Preparation of Copolymer R)

Into a reactor having an agitator, a nitrogen introduction pipe, and a distillation pipe were charged 900 parts by weight of dimethyl terephthalate, 450 parts by weight of 1,4-butane diol, 50 parts by weight of a polybutylene oxide glycol having an average molecular weight of 400, and 158 parts by weight of an ethylene oxide 2 mol adduct of tetrabromo bisphenol A, together with a small amount of a catalyst (0.7 part by weight of tetrabutoxy titanium), and the mixture was stirred under a stream of nitrogen gas at 180° C. for 30 minutes. The temperature was gradually raised and the mixture was heated at temperatures of 200° C.-270° C. under stirring for 3 hours. Then, after nitrogen introduction was discontinued, the reactor was gradually subjected to pressure reduction so that the pressure in the reactor was reduced to 0.5 mmHg in 15 minutes. Agitation was carried out under this pressure at 270° C. for 6 hours. The polymer thus obtained had an inherent viscosity of 1.0 and a Br content of 6.5% by weight.

EXAMPLE 1

Test specimens were prepared from copolymer produced in preparation Example 1, by employing an injection molding machine in a conventional manner. Tensile strength (kg/cm$^2$) and elongation (%) measurements were made according to ASTM D 638. Dielectric breakdown measurements were made according to ASTM D 149 short-term method, and dielectric constant measurements were made according to ASTM D 150, at 1 kHz. Flammability tests were made according to UL-94V; in these tests, where flame died and within 30 seconds, the specimen was rated o, and where flame did not die out within that time, the specimen was rated x. Oxygen index measurements were made according to JIS K7201. For surface configuration of molded part when heated, tests were made by heating the molded part in air at 120° C. for 24 hours. Presence of leaching (o) or no the leaching on molded part was visually examined. Test results are shown in Table 1.

By employing 90° cross heads (non-accentic head for center) with Tanabe Seisakusho singlescrew type extruder, copolymer P was coated on a copper round compressed strand of about 1.9 mm outer dia, at thickness settings of 0.3 mm and 0.4 mm. An adjustment region for discharge pressure of a gear pump was provided between the die and the screw, whereby discharge pressure was automatically controlled.

Mean concentricity values for the covering materials for transmission lines were 72% and 77% respectively.

With respect to the transmission lines obtained, wear resistance measurements were made at 20° C. and 60° C. according to JIS-C 3406 and by employing a 1350 g weight. Where minimum wear resistance value was more than 305 mm, the sample was rated o, and where such value was less than 305 mm, the sample was rated x. Mark Δ denotes that the number of samples rated o was within the range of 3–7 out of 10 samples. Test results are shown in Table 1.

EXAMPLE 2

Test specimens were prepared from the Preparation Example 2 copolymer Q in the same way as in Example 1, and transmission lines covered therewith in the same way were likewise tested for measurement. Test results are shown in Table 1.

EXAMPLE 3

Test specimens were prepared from the Preparation Example 3 copolymer R in the same way as in Example 1, transmission lines covered therewith in the same way were likewise tested for measurement. Test results are shown in Table 1.

COMPARATIVE EXAMPLES 1 AND 2

With polybutylene terephthalate (PET) and a flame retarder-containing PBT (UL94V-O), which consisted of PBT and, in mixture therewith, decarbromodiphenyl ether, as a flame retarder, respectively, measurements were made in the same way as in Example 1. The results are shown in Table 1. As is apparent from the results, no flame retardancy was present. With the flame retarder-containing PBT, leaching of the flame retarder was found at the stage of heating at high temperatures. This one was considerably inferior to the covering material of the invention.

EXAMPLE 3

Measurements were made with polyvinyl chloride in same way as in Example 1. Results are shown in Table 1.

Polyvinyl chloride can hardly be used for the purpose of thin coating for space saving to which the invention directed, and in environmental conditions in which vibration at hot temperatures is involved.

TABLE 1

| | Example | | | Comp Example | | |
|---|---|---|---|---|---|---|
| | 1 | 2 | 3 | 1 | 2 | 3 |
| Resin used | P | Q | R | PBT | PBT,retarder contained | PVC |
| Tensile strength (kg/cm$^2$) | 543 | 525 | 450 | 530 | 540 | 220 |
| Elongation (%) | 350 | 380 | >400 | 330 | 40 | 250 |
| Flammability Flame will die out within 30 sec | o | o | o | x | o | o |
| Oxygen index | 27 | 27 | 27 | 20 | 27 | 27 |
| dielectric breakdown (kV/mm) short-term method | 17 | 16 | 17 | 14 | 14 | 29 |
| Dielectric constant 1 kHz | 3.2 | 3.1 | 3.3 | 3.3 | 3.1 | 7.0 |
| Surface configuration of molded part when heated (regarder bleed) | o | o | o | o | x | o |

| Electric transmission line | Example 1 | | | | Example 2 | | | | Example 3 | | | | Comp Example 1 | | | | Comp Example 2 | | | | Comp Example 3 | | | |
|---|---|---|---|---|---|---|---|---|---|---|---|---|---|---|---|---|---|---|---|---|---|---|---|---|
| coat thickness (mm) | 0.3 | | 0.4 | | 0.3 | | 0.4 | | 0.3 | | 0.4 | | 0.3 | | 0.4 | | 0.3 | | 0.4 | | 0.3 | | 0.4 | |
| temperature (° C.) | 20 | 60 | 20 | 60 | 20 | 60 | 20 | 60 | 20 | 60 | 20 | 60 | 20 | 60 | 20 | 60 | 20 | 60 | 20 | 60 | 20 | 60 | 20 | 60 |
| Wear resistance | o | o | o | o | o | o | o | o | o | Δ | o | o | o | o | o | o | o | o | o | o | x | x | Δ | x |

EXAMPLE 4

Coating was made with copolymer P at 0.3 mm and 0.4 mm coat thickness settings in the same way as in Example 1, except that no adjustment was made for discharge pressure by the gear pump at the stage of covering operation. The mean concentricity values of the covering materials obtained were 66% and 70% respectively.

What is claimed is:

1. An electric transmission line, which comprises:

(i) an electrically conductive line, and (ii) a melt-extruded covering layer on the line consisting essentially of a halogen-containing, flame-retarding, aromatic copolyester obtained by the condensation polymerization of constituent (A) comprising an aromatic dicarboxylic acid or an ester-forming derivative thereof, constituent (B) comprising an aliphatic glycol or an ester-forming derivative thereof, and constituent (C) comprising an ester-forming compound containing a halogen atom, wherein when the ester-forming functional group of the halogen compound of constituent (C) is alcoholic, the proportion of constituents (B) and (C) is 90–200 mol, relative to 100 mol of constituent (A); and when the ester-forming functional group of the halogen compound of constituent (C) is of a carboxylic acid system, the proportion of constituent (B) is 90–200 mol, relative to 100 mol of constituents (A) and (C).

2. The electric transmission line as claimed in claim 1 wherein the covering layer has a thickness of 0.4 mm or smaller.

3. The electric transmission line as claimed in claim 1, wherein the copolyester has a halogen content of 0.5 to 20 mole percent.

4. The electric transmission line as claimed in claim 1, wherein said ester-forming compound has an average molecular weight of 390 or larger.

5. The electric transmission line as claimed in claim 1, wherein said halogen is bromine.

6. The electric transmission line as claimed in claim 1, wherein the aromatic dicarboxylic acid or an ester-forming derivative thereof is terephthalic acid or its derivative.

7. The electric transmission line as claimed in claim 1, wherein constituent (A) further comprises supplementary ingredients selected from the group consisting of dicarboxylic acids, or their derivatives; aliphatic acids, or their ester-forming derivatives; and aromatic hydroxycarboxylic acids, or their ester-forming derivatives.

8. The electric transmission line as claimed in claim 1, wherein the aliphatic glycol is a low molecular weight glycol of $C_2$–$C_8$.

9. The electric transmission line as claimed in claim 8, wherein the aliphatic glycol is selected from the group consisting of ethylene glycol, 1,4-butylene glycol, 1,3-propane diol, 1,4-butene diol, 1,6-hexane diol, and 1,8-octane diol.

10. The electric transmission line as claimed in claim 1, wherein the aliphatic glycol is a high molecular weight glycol.

11. The electric transmission line as claimed in claim 10, wherein the high molecular weight glycol is an alkylene oxide glycol.

12. The electric transmission line as claimed in claim 1, wherein constituent (B) further comprises aromatic alcohols, alkylene oxide adduct alcohols, polyhydroxy compounds, or their ester-forming derivatives.

13. The electric transmission line as claimed in claim 1, wherein the ester-forming compound containing a halogen atom of constituent (C) is selected from the group consisting of

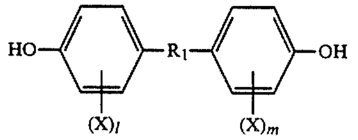

(1)

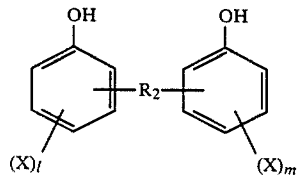

(2)

-continued
(3)
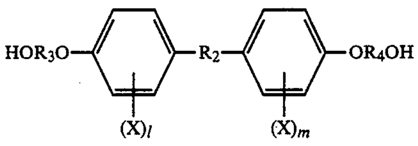
(4)
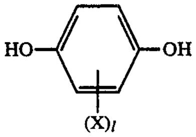
(5)
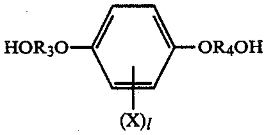
(6)
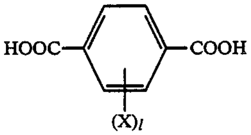
-continued
(7)
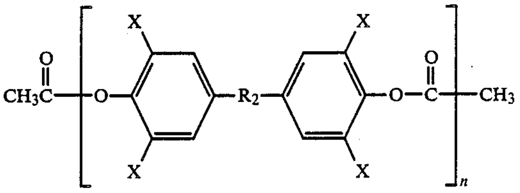
(8)
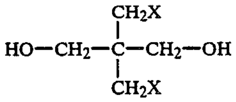
wherein,
$R_1$ and $R_2$ are selected from the group consisting of
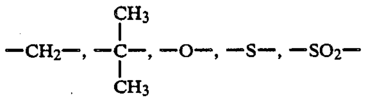
$R_3$ and $R_4$ are selected form the group consisting of $-C_2H_4-$, $-C_3H_6-$, $-(C_2H_4O)_n-$, $-(C_3H_6O)_n-$
X: halogen
l, m: 1–4
n: an integer of 1 or above.
14. The electric transmission line as claimed in claim 1, wherein the halogen atom in the copolyester is 0.5–20 mol % of all the monomer units A-C which comprise the copolyester.
* * * * *